May 21, 1963  G. R. SOWTER ETAL  3,090,136
RADAR ALTIMETER SIMULATOR
Filed April 7, 1959  6 Sheets-Sheet 2

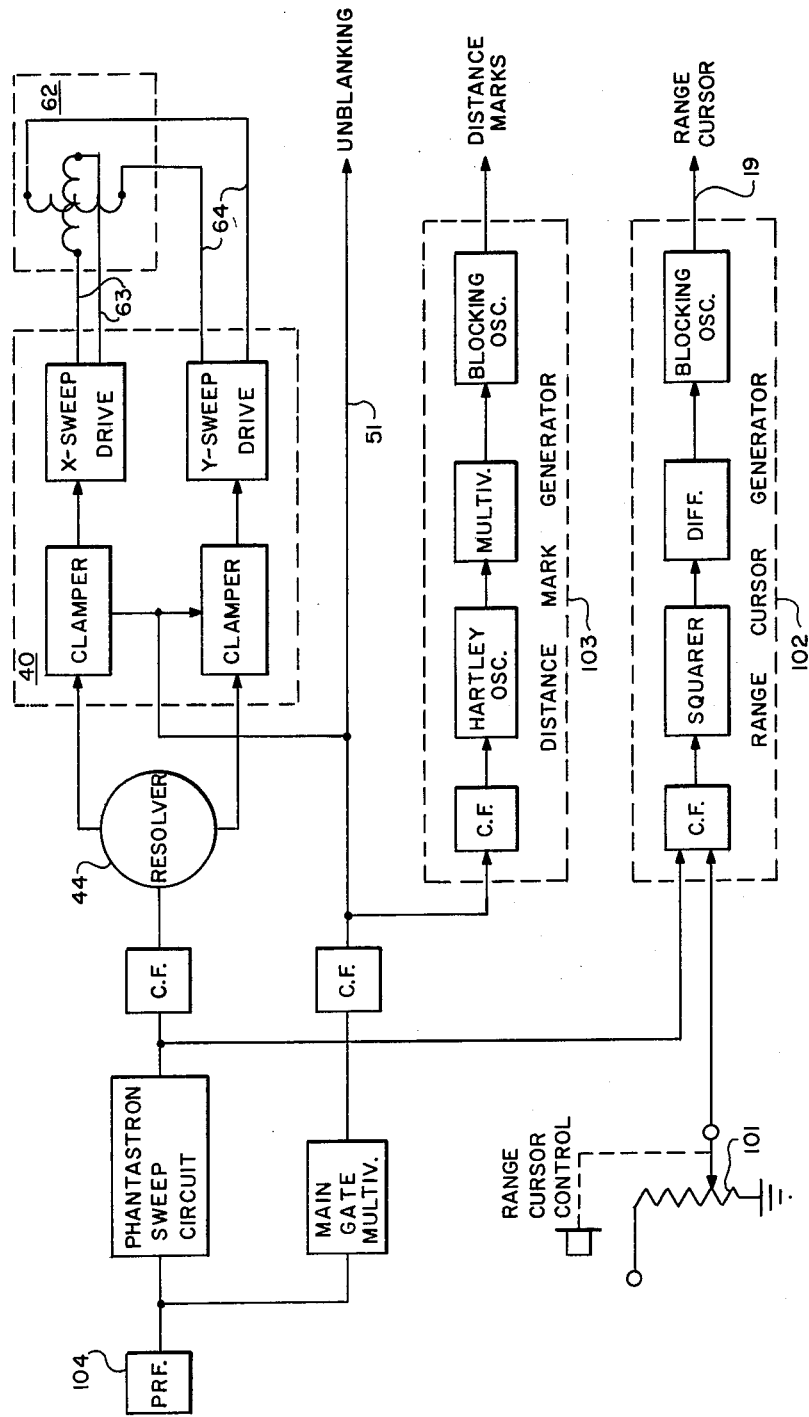

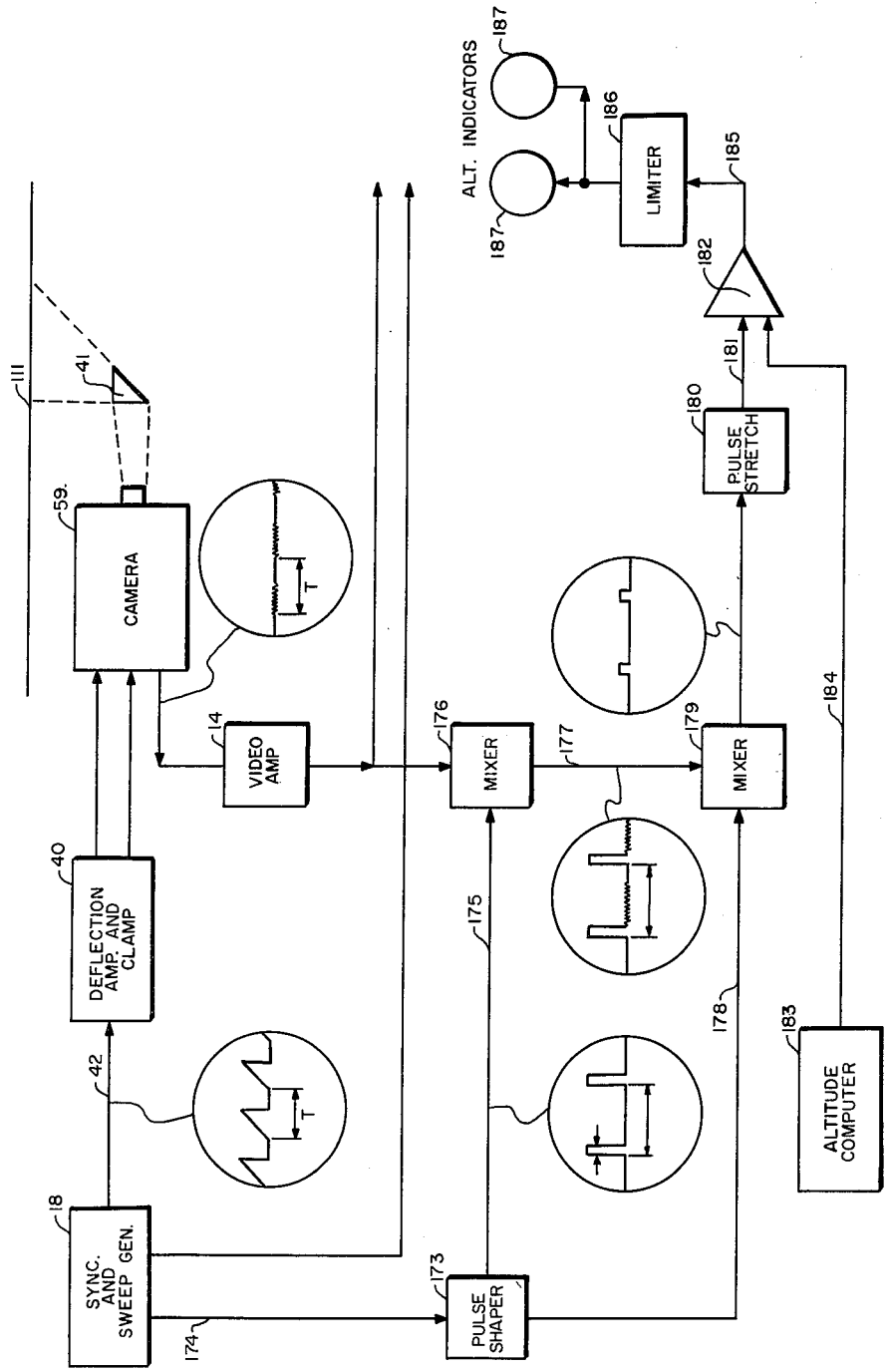

United States Patent Office 3,090,136
Patented May 21, 1963

3,090,136
RADAR ALTIMETER SIMULATOR
George R. Sowter, Silver Spring, and Robert M. Eisenberg, Rockville, Md., assignors to ACF Industries, Incorporated, New York, N.Y., a corporation of New Jersey
Filed Apr. 7, 1959, Ser. No. 804,756
3 Claims. (Cl. 35—10.4)

This invention relates to radar simulation apparatus and, more particularly, to equipment for training student radar operators in the use of radar equipment including a radar altimeter.

This application is related to applications S.N. 804,733, now Patent No. 3,066,424, and S.N. 804,755.

One known system utilized in radar simulation relies on a matched photoplate approach to the problem. The matched photoplate has one great advantage over all systems devised to date. This advantage lies in its ability to store huge land mass areas in a small space. Two photoplates are used to accomplish the information storage. One plate contains terrain elevation information, the other stores the reflectivity information for a given altitude. This pair of plates is scanned synchronously by two similar light-optical systems. Light sensitive type tubes are used to convert the light variations into electrical signals which are used to create the indicator displays. Shadow effects are produced synthetically by a computer receiving the terrain elevation video and terrain reflectivity video as inputs.

Scale ratios of 3 million or 4 million to 1 may be used. Thus, large areas of the earth's surface may be represented on two relatively small photoplates. There are several disadvantages which exist at present. These include heating problems due to the high intensity light sources, optical alignment problems which arise from the large scale ratios, poor integration of elevation effects in regard to aspect versus radar reflectivity, and poor low altitude simulation.

Many of the systems being developed and in use as simulators for the higher performance radar sets are classed as light reflective systems. This general class of systems strike a good balance between performance, accuracy of simulation, simplicity, durability, and flexibility. This invention to be described hereinafter may be classified as a light reflective system.

It is therefore a broad object of this invention to provide apparatus for the simulation of radar equipment.

It is a further object of this invention to provide a radar simulating system utilizing a scanned program light sensitive tube and light source in conjunction with a three-dimensional terrain model to simulate radar from land mass formations.

Another object of this invention is to provide apparatus for simulating the radiation altimeter indication of an aircraft.

It is still another object of this invention to provide absolute altitude indication material for use in radar simulation systems.

Other novel features and objects of the invention are set forth in the appended claims and the invention as to its organization and its mode of operation will best be understood from a consideration of the following detailed description of the preferred embodiment when used in connection with the accompanying drawings which are hereby made a part of the specification and in which:

FIG. 6 is a simplified block diagram of the synchronizer and vidicon sweep circuits.

FIG. 10 is a block diagram schematic of the video method of providing radar altimeter simulation.

The preferred embodiment of this invention provides for the use of a three-dimensional terrain map and a camera optical system whereby the camera is moved relative to the terrain map in accordance with the movements of the simulated aircraft. The resulting image is conducted to a simulated radar scope within the view of an operator. The three-dimensional terrain model is mounted on a flat bed or frame and may be cast in relief as blocks of plastic painted the proper color or gray shade corresponding to the radar reflectivity of the obect or objects. Water appears as a glossy black surface while land areas are painted a flat gray or are textured with fine grit to yield desired reflective properties.

Figure 5A:
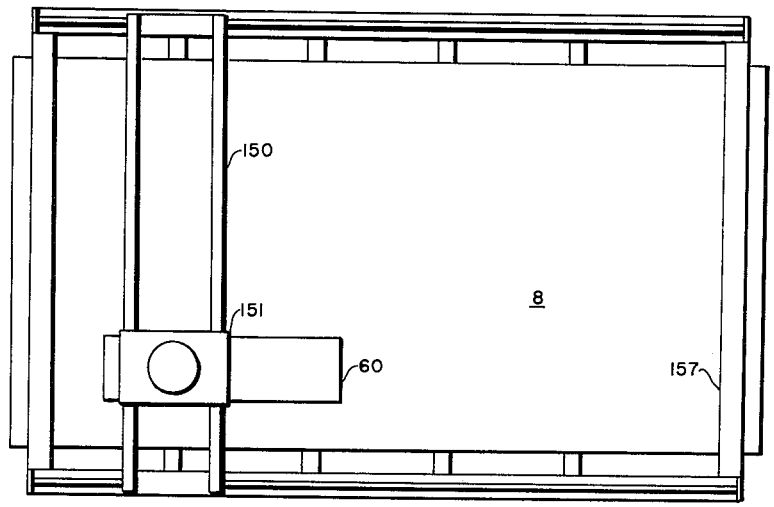
FIGS. 5a, 5b and 5c are representations of the gantry for moving the camera relative to the terrain map.
Figure 5B:
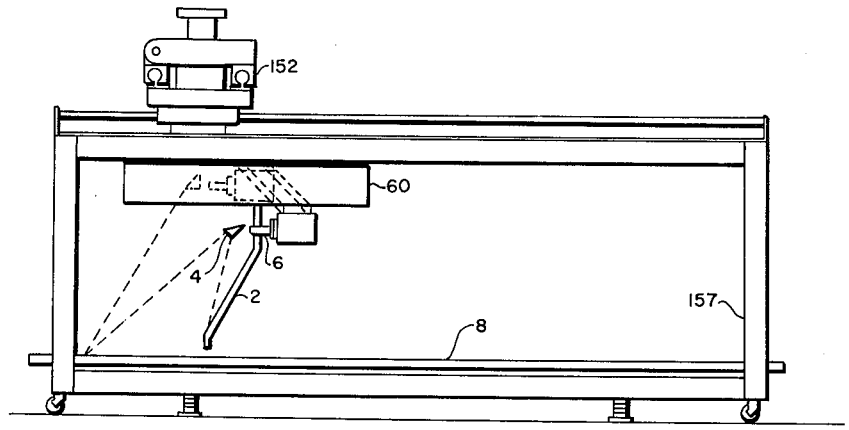
Figure 5C:
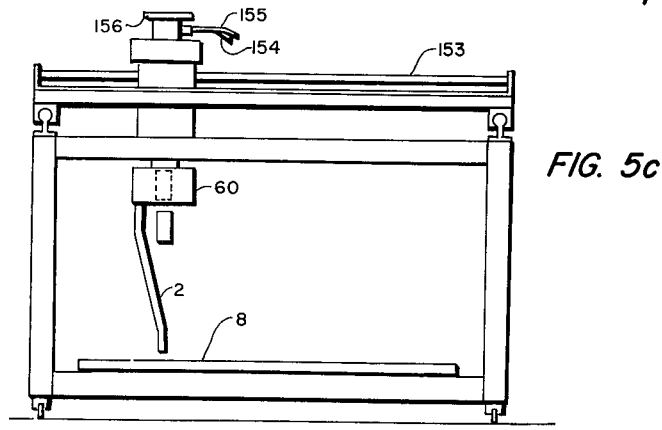

Ground mapping simulation will first be described with reference to FIG. 1 which is a block diagram of the ground mapping mode of operation. The assembly comprises a light source 2, a prism 4 and light pickup device or lens 6 arranged so that they may be positioned in rectangular or polar coordinates over a three-dimensional terrain model 8 in accordance with signals representing the position of the simulated radar carrying aircraft. FIGS. 5a, 5b and 5c show the arrangement of parts of the preferred embodiment wherein the frame 157 is mounted to surround the terrain model 8. The basic camera movements is controlled by a longitudinal carriage 150 and transverse carriage 151 which are motivated in accordance with movement of the simulated aircraft. The bearing housing 152 and guide rod 153 are mounted for movement on the frame 157 while the flexible cord 154, brush block 155 and slip ring assembly 156 move with the camera carriages. The assembly is capable of being rotated with the simulated aircraft bearing signals about a pivot point located near the center rear edge of the prism of FIG. 1. The light source 2 is provided with a vertical drive to enable its altitude above the terrain model datum plane to be varied in accordance with altitude signals representing the altitude of the simulated aircraft. The xy or rectangular coordinate position of the light source 2 relative to the prism 4 is fixed. The front of the light source is at the previously mentioned assembly pivot center line. The light beam emanating from the light source is shaped so as to evenly illuminate a sealed area on the map surface equal to or greater than the azimuth and range search area of the radar being simulated.

Figure 1:
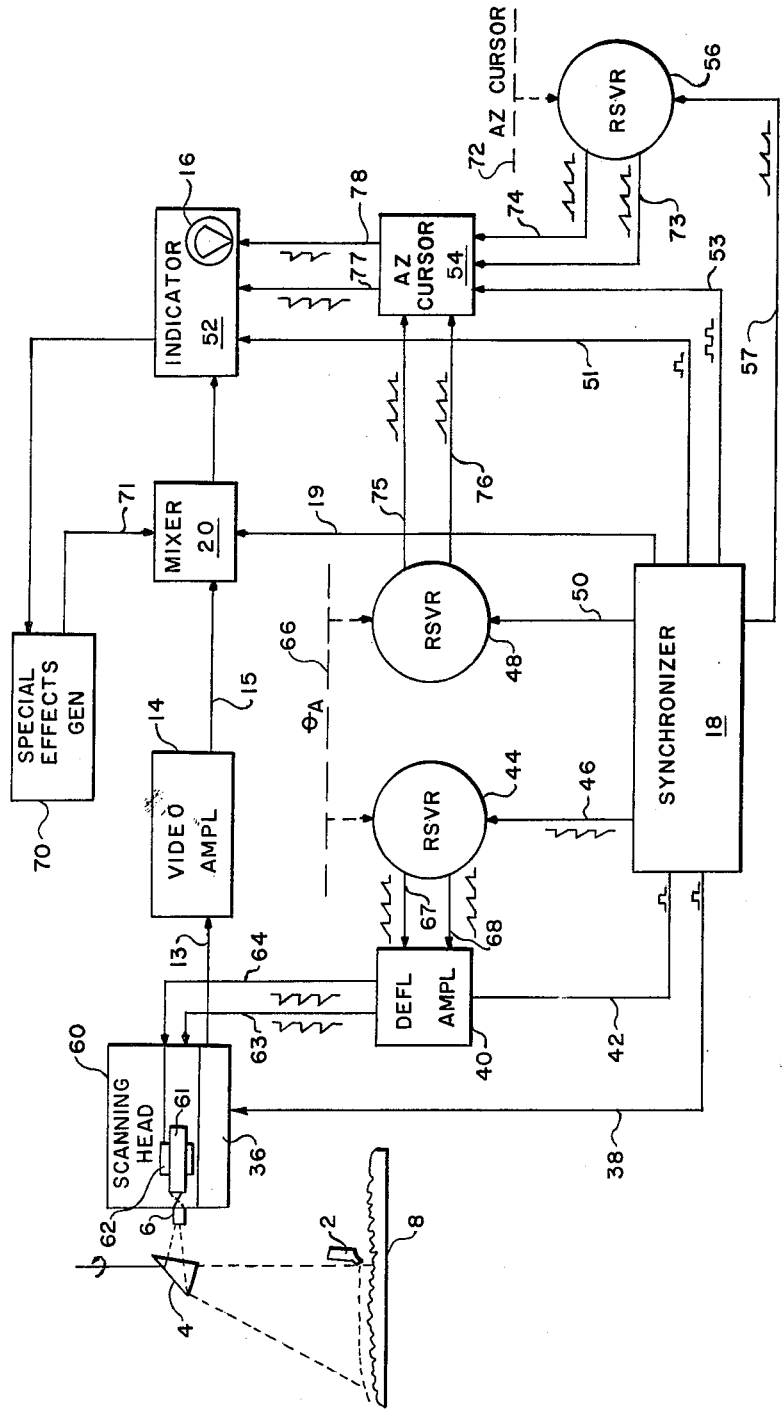
FIG. 1 is a block diagram of the system configuration for simulating the ground mapping mode of the radar equipment.

As indicated in FIG. 1 the area of interest i.e., the area to be presented on the simulated radar is focussed by the lens of the scanning head onto the photocathode of the camera tube. One purpose of the prism 4 is to enable mounting the camera tube in the horizontal position as to avoid the possibility of loose particles in the tube falling onto the face plate thereby causing damage. However, for some applications, vertical mounting may be preferred. The photocathode is commutated by the electron beam in the camera tube which is deflected in accordance with a P.P.I. sector scanning program.

A similar scanning is utilized to sweep the radar indicator tube screen in synchronism with the camera tube sweep. The video signals applied to the radar indicator cathode ray tube cause intensification of the trace of the correct position thereby painting on the indicator the image present on the photoconductive face plate of the camera tube. With the terrain model constructed according to radar return prediction data the presentation of the radar indicator is an accurate simulation of the presentation that would be observed on an actual airborne radar set over the terrain. Although a P.P.I. sector display is described here other types may be simulated with this technique. Any type of scan utilized by search radar systems is capable of being simulated by this system.

The sweeps, gating pulses, unblanking and clamping pulses and range marks are generated in the synchronizer unit 18. The design of the circuits in the synchronizer may be arranged to accommodate various pulse repetition rates, range mark spacing, altitude delay circuits and sweep expansion circuits so that any radar set performance may be accurately simulated. FIG. 6 is a simplified block diagram of a typical synchronizer circuit, vidicon sweep circuit and radar indicator sweep circuit for the simulation of a ground mapping radar system including distance mark generation and range cursor generation. The synchronizer circuit of FIG. 6 includes a pulse repetition frequency source 104 which drives the distance mark generator 103 as well as the range cursor generator 102 which, with an input from the range cursor control potentiometer 101, provides the range cursor output signals at conductor 19. The resolver 44 drives amplifier 40 to feed sweep voltages to the deflection coils 62 by means of conductors 63 and 64 as later described. The unblanking pulse on conductor 51 is utilized as next described in reference to FIG. 1.

In FIG. 1 the synchronizer 18 supplies an unblanking pulse to the scanning head pre-amplifier 36 way of conductor 38, a clamp pulse to the deflection amplifier and clamp circuits 40 by way of conductor 42, a sweep signal to resolver 44 thru conductor 46, a sweep signal to resolver 48 thru conductor 50, range cursors to the mixer 20 thru conductor 19, unblanking and clamp pulses to the radar indicator 52 thru lead 51, time share pulses to the azimuth cursor multiplex unit 54 by way of connection 53 and a sweep signal to the azimuth cursor resolver 56 by way of conductor 57.

The scanning head 60, comprising the lens 6, camera tube 61, deflection coils 62 and pre-amplifier 36 receives scanning signals from the deflection amplifier 40 by way of conductors 63 and 64. These sweeps are obtained by the action of the sweep signal on conductor 46 being resolved into sine and cosine components by resolver 44 which has its rotor positioned by the antenna bearing shaft 66, designated θ A. These resolved sweeps are conducted to deflection amplifier 40 by conductors 67 and 68 and thence to the scanning head by conductors 63 and 64. The unblanking pulse of lead 38 allows the video signal from the camera tube 61 to pass over conductor 13 to the video amplifier 14 and from there to the mixer amplifier 20 by way of lead 15. The video output of mixer 20 is a composite of the video from amplifier 14, range cursors from the synchronizer on lead 19 and special effects from the special effects generator 70 which conducts its signals to the mixer by conductor 71.

The resolver 56 generates azimuth cursor sweeps by the action of positioning the resolver rotor according to operation of the azimuth cursor control 72, to resolve the sweep applied to the resolver rotor into its sine and cosine components which appear on leads 73 and 74. The azimuth cursor multiplex unit 54 passes deflection sweep signals to the radar indicator 52 in the following manner. The radar indicator sweeps are generated by passing a synchronizer sweep signal thru conductor 50 to the rotor of antenna bearing shaft resolver 48. The resolved sweep signals are passed to the multiplex unit 54 by leads 75 and 76. The combined sweeps and cursor mark are passed to the radar indicator deflection coils by leads 77 and 78. In this manner video and sweep signals in accordance with the camera pickup are presented on the radar indicator at the azimuth angle selected by the operator by movement of his azimuth cursor control 72.

Various effects such as jamming, noise or the addition of electronically generated air targets are introduced from the special effects generator 70, into the system by means of a video mixer 20 as indicated in FIG. 1.

Figure 7:
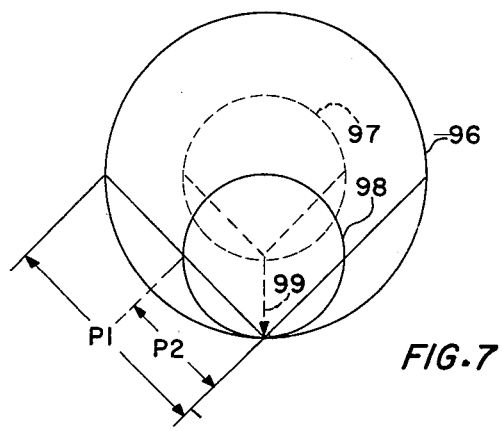
FIG. 7 is a representation of the field of view of two lenses which illustrates the scanning pattern compensation.

The simulated radar equipment has an operator control range selector which effects changes in the lens field of view. The lenses are mounted in a turret on the camera. The turret is remotely switched from the range selection control on the radar operators set control not shown. A wide angle lens is used for the longest range coverage. When shorter range operation is selected a lens with a narrower field of view is positioned in optical alignment with the vidicon and prism. Since the field of view is narrowed concentrically the prism must be tilted slightly about its lateral axis to return the rearmost edge of the field of view to the zero ground range point. FIG. 7 shows the field of view of two lenses and demonstrates the rearward shift necessary to accomplish the scanning pattern compensation. With the lowest point of circle 96 representing zero ground range, the dotted line 97 of FIG. 7 represents the field of view of a short range lens without compensation. When the prism is tilted slightly to move the field of view to pass through the zero ground range point the compensated field of view of the short range lens becomes the area encompassed by circle 98. The field of view of a long range lens is illustrated by circle 96 and its range coverage is represented as P1. The range coverage of the narrow angle or short range lens may be designated on P2 of FIG. 7. The dotted line 99 represents the movement of the zero range point as the prism is tilted.

The light source used with this technique consists of a lamp and housing, a collimating optical assembly and a light pipe. The lamp is of relatively low power. The light pipe is constructed of a plastic rod ⅛" in diameter. This rod is shaped at its lower end to disperse the light in a sectorial pattern. This approach is used to allow the light source to travel in depressions in the terrain model surface, thereby enhancing the low altitude simulation.

A low power light may be used as a source for two reasons. First, this technique does not depend on a programmed light beam with its many optical elements. The light losses do not necessitate a high intensity lamp to transmit the necessary light through multiple optical interfaces to the maps surface. Second, the camera tube possesses excellent photosensitivities. Some of the camera tubes now in production are capable of producing satisfactory video signals with as little as 0.2 footcandles of illumination on the faceplate of the tube. The heating problems attended to high intensity shaped beam sources are thereby eliminated, allowing the light source to travel in close proximity to the map surfaces without danger of causing damage to the plastic material. Since the light source will be very close to the surfaces during the low altitude operation a means of preventing physical damage due to a collison with the map is provided.

The map is constructed of a plastic material and cast from a master mold. The target complexes are stored in relief with blocks of the map material representing targets and groups of targets. Water is represented by a glossy black surface. A class "1" or highly reflective target is painted white on the faces of the target blocks. Three shades of gray are used to represent targets of lower reflectivity classification and terrain. Texturing is used where applicable to create rough surface terrain reflectively. The resultant model is a three-dimensional radar prediction map of a portion of the earth's surface. Target areas are constructed as inserts so that they may be removed and replaced by modified target areas. Small changes may be made on the models surface by hand if the proper tools are used. The target inserts are faired into the surrounding map contours so that the line of demarkation is not visible to the camera. The entire map is braced on its underside so as to prevent sagging. In one embodiment a map of this type measuring 11' x 5' with necessary integral bracing and mounting provision was utilized. Indexing marks are provided on the edge of the map with an alignment pin mounted in the exact center of the map base to meet with the bushing in the map bed.

Figure 8:
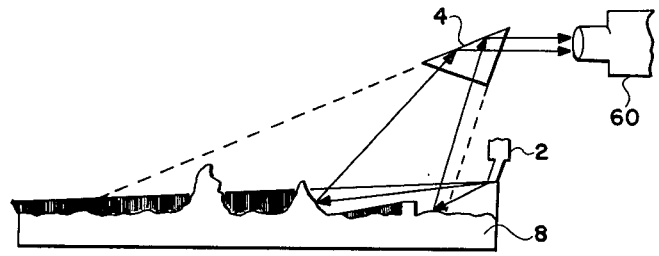
FIG. 8 is an elevation view showing the orientation of camera and prism when the simulated aircraft is at a low altitude.

When the simulated aircraft is at high and medium altitudes the camera and prism are oriented so that the view is essentially perpendicular to the map's surface and the vertical side of the target blocks are not seen by the camera. At lower altitudes, the prism 4 is rotated to decrease the angle of incidence as shown in FIG. 8. In order to continue observing the same map area, the camera is moved back as the prism is rotated so as to maintain the same map area focussed on the photocathode. Since the aforementioned action would result in a larger area being observed the camera is lowered so as to maintain the same field of view. The motion of the entire assembly is accomplished smoothly as a function of altitude. At altitudes above 10,000 to 15,000 feet, the exact altitude depending upon the map scaling and system geometry, the assembly is maintained at a fixed height above the model's datum plane. As the simulated aircraft descends through the upper altitude limit a servo motor begins moving the assembly down and aft. The lower limit of the assembly motion is reached as the aircraft descends through the lower altitude limit, 2,000 to 5,000 depending on the lens field of view and system geometry. At any flight altitude below this limit the assembly remains fixed in its lower position. Note that the light source does not move with the camera and prism assembly, but continues to servo to a position simulating the aircrafts position in space. This camera assembly motion is an auxiliary motion used to create good low altitude simulation.

Shadowing effects are realistically produced as the light source is raised and lowered as a function of simulated altitude as is evident from FIGS. 1 and 8. The camera sees only the surfaces of the map which are illuminated. Therefore, the video output from targets and terrain is obtained only when they are not in the shadowed areas.

This system has indicated a resolution capability of 800 lines. The scale range resolution while simulating a radar range of 80 nautical miles is then 608 feet. This exceeds the actual range resolution capability of an airborne ground mapping radar system with a pulse width of 1 microsecond. The range resolution of the simulator improves when shorter radar ranges are simulated.

When this radar simulation device is to be used as a portion of a flight and tactics simulation system the gantry motion, light source motion and the camera motion are programmed from the flight simulators position, bearing and altitude computers. These computers utilize and compute information as designated below.

$V_n$ = Aircraft horizontal velocity
$\psi$ = Aircraft heading
$\psi_m$ = Orientation of the map major axis
$K$ = Scaling factor of the terrain model
$\overset{\circ}{L}_O$ = Longitudinal carriage rate
$\overset{\circ}{L}_A$ = Lateral carriage rate The longitudinal carriage motion is described by the expression $\overset{\circ}{L}_O = V_n \cos(\psi - \psi_m)/K$. The lateral carriage motion is described according to the expression $$\overset{\circ}{L}_A = V_n \sin(\psi - \psi_m)/K$$

Where $\overset{\circ}{L}_n$ = Rate of vertical motion of the light source, and $\frac{dh}{dt}$ = Rate of change of aircraft altitude The vertical motion of the light source is described by the expression $$\overset{\circ}{L}_h = \frac{dh}{dt}/K$$

The turning rate $$\frac{d\psi}{dt}$$

computed for the simulated aircraft drives the camera, prism and light source assemblies about their turning axes at the rate of turn of the simulated aircraft.

The radar set controls and indicator controls with appearance and function identical to that of the actual radar system are located in the simulator cockpit or simulated aircraft radar operators station. A plot of the simulated aircraft's track of the earth's surface is recorded during a flight or mission, thus allowing a post mission critique for training purposes.

In addition to its use as an operational training device the system may be installed so as to provide classroom training in the skill of reading and interpreting the displays of a radar system.

Figure 2:
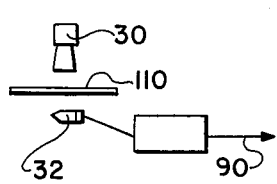
FIG. 2 is a representation of a system employing a scanning device and a transparency for controlling the radar presentation.

FIG. 2 shows a method utilizing a photo transparency whose emulsion density is inversely proportional to terrain altitude. The area of the earth's surface represented by this transparency is identical to that of the same area depicted by the three-dimensional terrain model in use for the ground mapping problem. A flying spot scanner 30, positioned horizontally in synchronism with the camera prism and light source assembly on the terrain model gantry, and deflected in the same scan program as that of the camera tube, is mounted on one side of the transparency 110. A photomultiplier tube 32 is positioned in the same manner on the opposite side of the transparency. The output 90 of the photomultiplier for each sweep made by the flying spot is a wave form whose instantaneous amplitude at any point on the wave is proportional to the terrain altitude at that same point in range on the map's surface.

Figure 3:
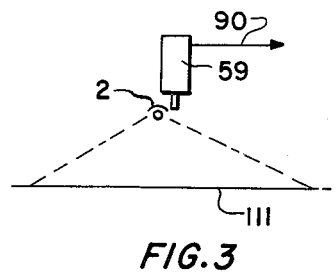
FIG. 3 is a representation of a camera scanning system in which an opaque print of the terrain is employed.

FIG. 3 shows a method whereby an opaque print 111 and camera tube 59 are used in lieu of the transparency and flying spot scanner to derive the terrain altitude voltage. The terrain elevation information is stored on the print as varying shades of gray. The highest terrain being depicted by white and lowest being depicted by black.

Figure 4:
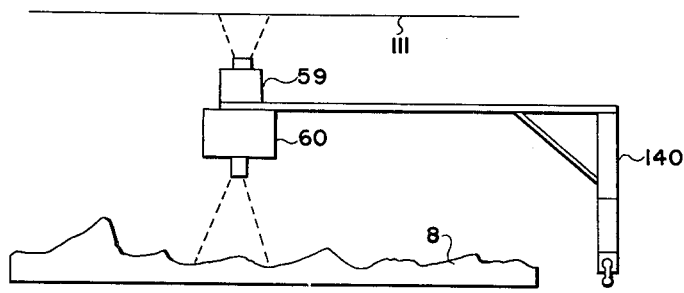
FIG. 4 shows the arrangements of opaque print and three-dimensional terrain map relative to the camera carrying apparatus.

This additional equipment just described may be mounted in a number of ways, the choice of mounting being determined by the space available. The transparency or opaque print may be mounted under the terrain model bed or suspended above the terrain model carriages as in FIG. 4 with the light source and pickup driven directly by the terrain model gantry 140. These auxiliary devices may also be mounted vertically on the side of the gantry or in a separate cabinet with servo drives for the light source and pickup devices receiving their inputs directly from the gantry servos.

The choice of either the transparency 110 or opaque print 111 techniques is dependent on the space available. It will be noted from FIGS. 2, 3 and 4 that the transparency 110 requires the use of devices mounted on either side of the plate while the opaque print 111 need only have components on one side. The cost of either of these elevation storage mediums is a function of the scale ratios required, the larger scale ratio being the more expensive choice. In operation the amplitude of the actual contour information voltage is compared to the preset clearance altitude amplitude voltage and when the contour information is greater than the desired clearance the video from the terrain model camera is gated into the operator's radar indicator permitting this video to be displayed. By this means only the video from objects above the clearance plane are displayed to the operator.

Many modern day aircraft utilize a radio or radar altimeter for indicating to the pilot his exact distance above the ground. The use of this type of equipment has the advantage that the pilot need not know the altitude of the ground above sea level for determining his own altitude above the ground. Also, since the range limits of the radar altimeter are much less than a pressure activated instrument, but more accurate within the smaller range, accurate simulation of a radar altimeter is difficult to obtain. This invention provides apparatus for accurately simulating radar altimeter systems.

Since the terrain map transparency 110 of FIG. 2 and the terrain map print 111 of FIG. 3 have shading gradients between black and white in dependence upon terrain contour or altitude, the light passing through the transparency or reflected from the print at the point representing the simulated aircraft position is a measure of the aircraft altitude above the terrain at that point.

As the sweep originates at the point representing the aircraft position and moves radially from that point, the video level at the beginning of each sweep represents or is a measure of the altitude distance between the simulated aircraft and the terrain immediately below it.

Figure 9:
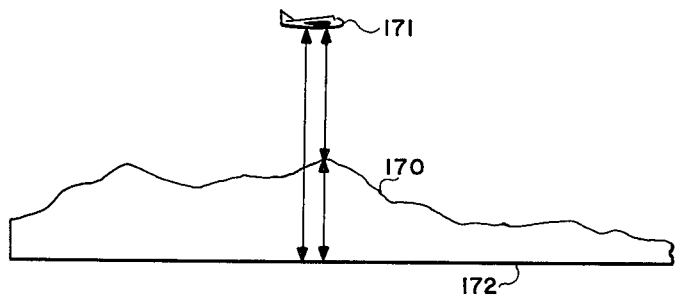
FIG. 9 is an elevation view of the relative positions of aircraft, sea level and terrain contour.

The problem to be solved is illustrated by reference FIG. 9 in which the terrain line 170 represents the contour of the earth's surface beneath an aircraft 171. The sea level datum plane is indicated as 172. A pressure activated altimeter will read the distance between the aircraft 171 and the sea level line 172. A radar altimeter will read the distance between the aircraft and the terrain line 170. Apparatus for simulating the indications of a radar altimeter therefore will utilize the absolute altitude measurement from simulated aircraft to sea level and subtract from it the depth or distance between the terrain line 170 and the sea level datum line 172. The resulting distance will be the distance between the aircraft of the terrain line.

This invention provides apparatus utilizing the land mass generator for obtaining an accurate radar altimeter simulation. FIG. 10 shows the preferred embodiment of this system in which certain portions of the land mass simulator and their associated video circuitry are utilized to provide the terrain depth information. As shown in FIG. 10 the master synchronizer and sweep circuit generator 18 is the same unit as shown in FIG. 1 having the numerical designation 18. In like manner, the deflection amplifiers and clamp circuits 40, the video amplifier 14, the camera 59 and its associated prism 41 are similar to that shown in FIG. 1 of the land mass simulator.

As the camera is continuously sweeping from a point directly under the position of the simulated aircraft out to the range of the radar being simulated, the video occurring at the beginning of each sweep is a measure of the instantaneous terrain thickness directly under the aircraft. This invention utilizes the measure of absolute altitude and subtracts from it the terrain thickness or depth measurement to yield aircraft to terrain distance in the form of a D.C. voltage for activation of radar altimeter indicators. In FIG. 10 a pulse shaper 173 receives a synchronized pulse of a master synchronizer 18 by way of connector 174. This shaper generates a pulse for transmission by conductor 175 to the mixer 176. The capital letter "T" corresponds in time to the period of the sweeps generated by the master sweep circuits and is indicated by the signal shown on conductor 42. The video terrain signal is sent from a video amplifier 14 to a mixer 176 where the pulse shaper pulse from lead 175 is modulated with the terrain video.

The effect of this is to produce a signal as shown at the mixer output 177 in which the pedestal or pulse containing the video of a sweep initiation occurs at the beginning of each period followed by that video resulting from a remainder of the sweep time. The pulse shaper 173 also produces a D.C. reference level on conductor 178 which is analogous to the pulse height appearing on conductor 175. The combination of the D.C. reference level with the pulsed video from lead 177 results in the signal shown on the conductor at the output of mixer 179, which is a measure of the terrain video for a period dependent on the pulse width of the shaper pulse. This video is conducted to the pulse stretcher 180 which time averages the signal representative of the terrain contour immediately under the simulated aircraft to yield a positive D.C. signal proportional to the video amplitude at the output of mixer 179. This D.C. level is summed at summing amplifier 182 with a negative D.C. signal which is proportional to the distance between the simulated aircraft and the sea level datum line. This signal is obtained from an altitude shaft or analogue computer 183 which provides a D.C. signal proportional to aircraft altitude and of polarity opposite to that of the terrain amplitude. This D.C. voltage is conducted to summing amplifier 182 by means of conductor 184. The summation or subtraction of the two signals results in a D.C. voltage on lead 185 which is proportional to the difference between the aircraft to sea level distance and the terrain line to sea level distance. This measure of aircraft altitude above the terrain is then fed to amplifier and limiter circuits 186 which, in turn, activate the radar altimeters 187. The radar altimeter dial and pointer indication therefore at any time is a measure of the distance between the aircraft and the terrain immediately below the simulated aircraft position. The omission of the altitude input to amplifier 182 would yield an indication of terrain altitude which may be desirable in some applications.

Figure 11:
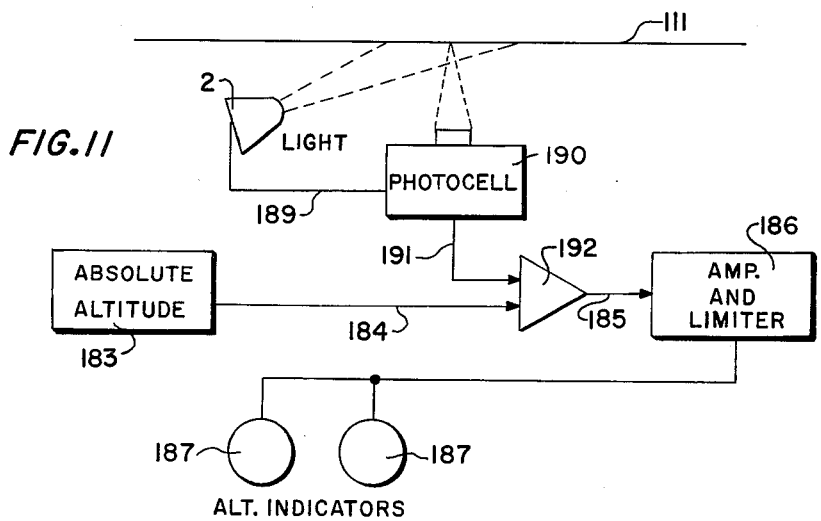
FIG. 11 is a block diagram schematic of the photocell method of providing radar altimeter simulation.

Another method for simulating radar altimeter apparatus is indicated in FIG. 11 in which the contour plate or print 111 is mounted proximate to the gantry so as to be viewed by detector apparatus. The contour plate or print 111 contains black to white shading in dependence upon the terrain thickness at all points and light reflected from it will be a measure of this terrain thickness. In the apparatus shown in FIG. 11 a photocell or photo multiplier is mounted with the camera so as to scan a portion of the contour plate 111 in dependence upon movements of the simulated aircraft over the terrain. A light soure 2 is supplied to give uniform lighting over the surface of the photo or contour plate 111. The photocell 190 is focussed on the point of interest directly below the simulated aircraft position. Its output is a D.C. signal proportional to the terrain altitude above sea level and this information is fed by conductor 191 to summing amplifier 192. As in the last example, an altitude shaft or computer 183 provides a negative D.C. signal on conductor 184 which is proportional to the aircraft altitude above sea level. The addition of these two oppositely polarized voltages results in a D.C. voltage on conductor 185 which is a measure of the difference between the distance between aircraft to sea level and the distance between the terrain line to sea level. This resulting aircraft to terrain analog voltage is fed to amplifier and limiter 186 and thence to the radar altimeters 187.

The video type of radar altimeter utilizes video information available from the ground contour plate of the land mass simulator to provide the voltages necessary to activate the radar altitude indicators. The photo cell method requires fewer components to utilize the information necessary for activation of the radar altimeters but does require the additional photocell unit to be mounted upon the gantry. Both methods utilize the photographic or contour plate or transparency to obtain information regarding the distance between the terrain line and the sea level datum plane. In the photocell method of radar altimeter simulation if it is desired to use a transparency rather than the print 111 a scanner must be mounted on the opposite side of the transparency from the photocell or the photomultiplier. The position of the light source also depends on whether the contour plate is a transparency or an opaque substance. If the opaque material is used the light source must be on the same side of the plate as the photocell unit whereas the use of a transparency necessitates the light source being upon the opposite side of the plate from the photocell. Each of the apparatus just described provide high resolution radar altimeter simulation from the information present on the contour plate the sensitivity of the photocell method depends to a large extent upon the focussing of the photocell lens. If a small point of area is scanned the variations of radar altimeter indication will be more abrupt and more sensitive than if a larger area is scanned during the simulated flight. It may be readily seen that if a large area is scanned by the photocell or photomultiplier and the simulated aircraft moves across the terrain map the change in photocell level will not be a rapid one and the resulting radar altimeter indications will then be the more gradual nature than if a small area or point is scanned by the photocell.

The feedback connection 189 between the light source 2 and the photocell 190 of FIG. 11 is representative of stabilizing means available for assuring constancy of indications. This is obtained by monitoring the intensity of the light source 2 and feeding back to the photocell or photomultiplier 190 a signal analagous to the light intensity. This signal is utilized to vary the sensitivity of the photocell. The overall effect is to increase the sensitivity of the photocell if the light intensity decreases and to decrease the photocell intensity if the light intensity increases. This provides stable photocell output in spite of variations which may occur in the light intensity.

The techniques described in this invention provide a solution to many of the problems which have made other radar simulation techniques unattractive.

The apparatus for simulating a radar altimeter system described herein indicates to a student operator the distance between his simulated aircraft and the ground level to a higher degree of accuracy than hitherto possible.

It should be understood that this invention is not limited to specific details of construction and arrangement herein illustrated and that changes and modifications may occur to one skilled in the art without departing from the spirit of the invention; the scope of the invention being set forth in the following claims.

What is claimed is:

1. Radar altimeter simulation apparatus for use with a flight trainer comprising a contour plate possessing the characteristics of ground elevation of an area of interest, light source means so positioned as to illuminate the said contour plate, photocell means mounted proximate the contour plate, focussed upon said plate and arranged for relative movement thereto, the output of said photocell means being a D.C. potential analogous to the ground elevation of the illuminated area included within the view of the photocell means, altitude indicative means responsive to the altitude of the simulated flight above a ground elevation reference for generating a D.C. potential analogous to said altitude, difference means responsive to the said two D.C. potentials for generating a potential analogous to the distance between the simulated flight position and the ground, and indicating means responsive to the last mentioned potential for displaying the computed distance.

2. In a flight simulator having means for computing the altitude of a simulated aircraft above sea level, a simulated radar altimeter system comprising light reflective means representative of earth contour and having various reflective properties in accordance with particular areas of earth contour as referenced to sea level being duplicated by the light reflective means, light source means positioned to illuminate said light reflective means, light absorption measuring means focussed upon said light reflective means and arranged for relative movement thereto for generating a first potential analogous to the altitude of the earth's contour at the point of interest, means for generating a second potential analogous to the distance of the simulated aircraft above sea level, differential means responsive to the said first and second potentials for providing a difference potential whose amplitude is analogous to the distance between the simulated aircraft and the earth contour and indicating means for displaying the last named distance on a simulated radar altimeter.

3. In a flight simulator having means for computing the altitude of a simulated aircraft, radiation altimeter simulation apparatus comprising a photographic plate having two dimensional ground elevation information stored thereon, a vidicon camera positioned to view the said photographic plate and movable in a plane parallel to the plane of the photographic plate so that various portions of the plate may be viewed by the camera, means for sampling a portion of the video signal from the vidicon camera representative of an aircraft's position, rectifying means for generating a D.C. potential proportional to the amplitude of the sampled video signal, means responsive to said computing means for generating a D.C. potential analogous to the distance between the simulated aircraft and a datum line of the ground elevation, said latter potential being of opposite polarity from the former, summing means for electrically adding the two oppositely polarized potentials to yield a resultant potential which is analogous to the distance between the said simulated aircraft and the ground elevation, and indicating means having the appearance of a radiation altimeter for indicating the distance between the said simulated aircraft and the ground elevation.

References Cited in the file of this patent

UNITED STATES PATENTS

| | | |
|---|---|---|
| 2,206,036 | Herson | July 2, 1940 |
| 2,652,636 | Garman et al. | Sept. 22, 1953 |
| 2,737,730 | Spencer | Mar. 13, 1956 |
| 2,788,588 | Lindley | Apr. 16, 1957 |
| 2,809,340 | Bernhart | Oct. 8, 1957 |
| 2,841,886 | Cutler | July 8, 1958 |
| 2,847,855 | Berger | Aug. 19, 1958 |